United States Patent
Ruaro et al.

(10) Patent No.: US 10,355,344 B1
(45) Date of Patent: Jul. 16, 2019

(54) ELECTRONIC DEVICES HAVING ANTENNA DIVERSITY CAPABILITIES

(71) Applicant: Apple Inc., Cupertino, CA (US)

(72) Inventors: Andrea Ruaro, Campbell, CA (US); Carlo Di Nallo, Belmont, CA (US); Dimitrios Papantonis, Cupertino, CA (US); Eduardo Jorge Da Costa Bras Lima, Sunnyvale, CA (US); Jayesh Nath, Milpitas, CA (US); Jiaxiao Niu, Shanghai (CN); Mario Martinis, Cupertino, CA (US); Mattia Pascolini, San Francisco, CA (US); Zheyu Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/903,733

(22) Filed: Feb. 23, 2018

(51) Int. Cl.
| | | |
|---|---|---|
| *H04B 7/02* | (2018.01) | |
| *H04L 1/02* | (2006.01) | |
| *H01Q 1/27* | (2006.01) | |
| *H01Q 13/10* | (2006.01) | |
| *H04B 1/40* | (2015.01) | |
| *H04B 1/3827* | (2015.01) | |
| *H04B 17/318* | (2015.01) | |
| *H01Q 1/22* | (2006.01) | |
| *H01Q 1/24* | (2006.01) | |
| *H04B 5/00* | (2006.01) | |

(52) U.S. Cl.
CPC .............. *H01Q 1/273* (2013.01); *H01Q 13/10* (2013.01); *H04B 1/385* (2013.01); *H04B 1/40* (2013.01); *H01Q 1/2291* (2013.01); *H01Q 1/241* (2013.01); *H04B 5/0037* (2013.01); *H04B 17/318* (2015.01)

(58) Field of Classification Search
CPC ...... H01Q 1/273; H01Q 13/10; H01Q 1/2291; H01Q 1/241; H01Q 1/2266; H04B 1/40; H04B 17/318; H04B 5/0037; H04B 1/385; H04B 1/3838
USPC ......................................... 375/267, 299, 347
See application file for complete search history.

(56) References Cited

U.S. PATENT DOCUMENTS

| | | |
|---|---|---|
| 8,781,420 B2 | 7/2014 | Schlub et al. |
| 8,947,302 B2 | 2/2015 | Caballero et al. |
| | (Continued) | |

OTHER PUBLICATIONS

Pascolini et al., U.S. Appl. No. 15/442,463, filed Feb. 24, 2017.

*Primary Examiner* — Phuong Phu
(74) *Attorney, Agent, or Firm* — Treyz Law Group, P.C.; Michael H. Lyons

(57) ABSTRACT

An electronic device such as a wristwatch may be provided with a wireless local area network (WLAN) transceiver, satellite receiver, and cellular transceiver. A first antenna may include a radiating slot between a conductive housing wall and a display module. A second antenna may include conductive structures that radiate through a rear face of the device. The WLAN transceiver and the satellite receiver may be coupled to the first antenna. A switch may be coupled between the cellular transceiver and the first and second antennas. Control circuitry may adjust the switch to route signals between the cellular transceiver and a selected one of the first and second antennas based on wireless performance metric data so that the antenna exhibiting superior wireless performance at cellular telephone frequencies is used for cellular telephone communications regardless of environmental conditions.

21 Claims, 9 Drawing Sheets

(56) References Cited

U.S. PATENT DOCUMENTS

| | | |
|---|---|---|
| 9,793,599 B2 | 10/2017 | Di Nallo et al. |
| 2009/0295648 A1* | 12/2009 | Dorsey ............... H01Q 1/2266 |
| | | 343/702 |
| 2016/0043752 A1* | 2/2016 | Slater ................. H04B 1/3838 |
| | | 375/297 |
| 2017/0033439 A1 | 2/2017 | Liu et al. |
| 2017/0302306 A1 | 10/2017 | Ouyang et al. |
| 2018/0048058 A1 | 2/2018 | Ehman et al. |
| 2018/0090826 A1 | 3/2018 | Da Costa Bras Lima et al. |

* cited by examiner

ELECTRONIC DEVICES HAVING ANTENNA DIVERSITY CAPABILITIES

BACKGROUND

This relates to electronic devices, and more particularly, to electronic devices with wireless communications circuitry.

Electronic devices are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device such as a wristwatch may be provided with wireless circuitry. The wireless circuitry may include transceiver circuitry such as a wireless local area network transceiver, a satellite navigation receiver, and a cellular telephone transceiver. The wireless circuitry may include antennas for conveying radio-frequency signals for the transceiver circuitry.

The electronic device may have front and rear faces and may include a display on the front face. The electronic device may include a housing having a rear housing wall on the rear face. The housing may include conductive housing sidewalls extending between the display and the rear housing wall. The display may include conductive display structures that are separated from the conductive housing walls by a slot. The slot may form an antenna resonating element for a first antenna at the front face of the device. The first antenna may include a first antenna feed coupled between the conductive display structures and the conductive housing walls across the slot. Conductive structures such as conductive traces may form an antenna resonating element for a second antenna at the rear face of the device. The second antenna may include a second antenna feed coupled between the conductive traces and the conductive housing walls. The second antenna may transmit and receive radio-frequency signals through the rear housing wall.

The wireless local area network transceiver may be coupled to the first antenna and may convey radio-frequency signals in wireless local area network communications bands using the first antenna. The satellite navigation receiver may be coupled to the first antenna and may receive radio-frequency signals in a satellite navigation communications band using the first antenna. The wireless circuitry may include switching circuitry having a first terminal coupled to the first antenna, a second terminal coupled to the second antenna, and a third terminal coupled to the cellular telephone transceiver circuitry. Control circuitry in the electronic device may control the switching circuitry to route radio-frequency signals in a cellular telephone communications band between the cellular telephone transceiver circuitry and a selected one of the first and second antennas at a given time. The wireless local area network transceiver and the satellite navigation receiver may perform wireless communications using the first antenna whereas the second antenna only handles cellular telephone communications, if desired.

The control circuitry may gather wireless performance metric data associated with wireless performance of the first and/or second antennas in the cellular telephone communications band. The control circuitry may control the switching circuitry based on the wireless performance metric data so that the antenna that exhibits optimal wireless performance in the cellular telephone communications band is used for conveying radio-frequency signals for the cellular telephone transceiver, regardless of any change in the environmental conditions of the device. The wireless performance metric data may include receive signal strength data such as Received Signal Strength Indicator (RSSI) data, impedance information measured using radio-frequency couplers coupled to the first and second antennas, and/or any other desired performance metric data.

DETAILED DESCRIPTION

Figure 1:
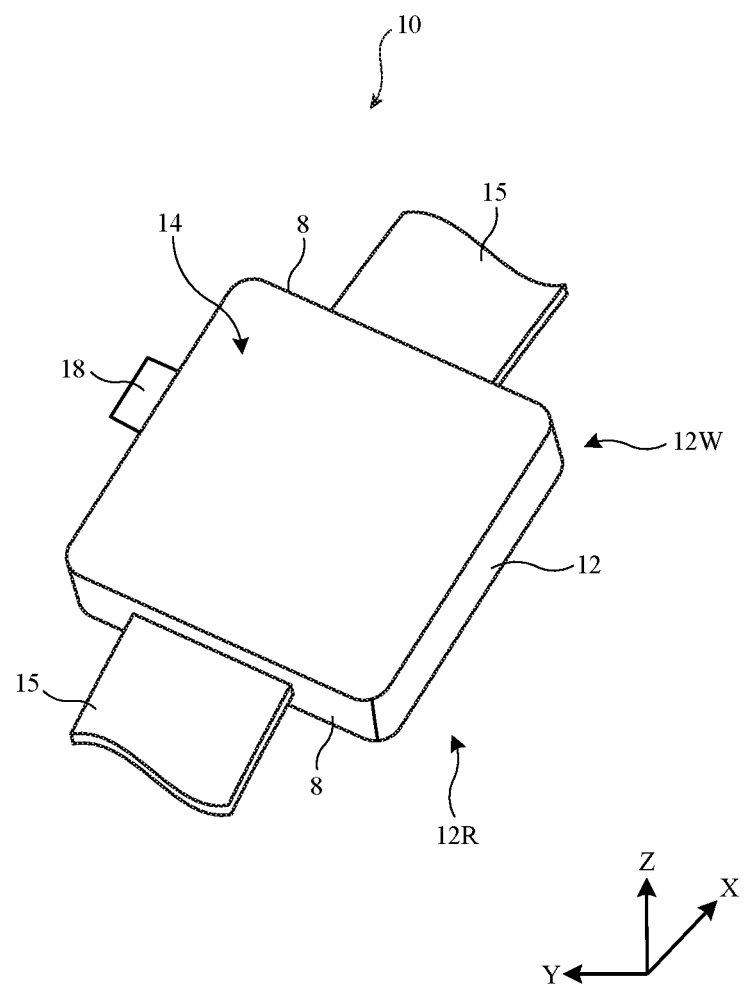
FIG. 1 is a perspective view of an illustrative electronic device with wireless circuitry in accordance with an embodiment.

An electronic device such as electronic device 10 of FIG. 1 may be provided with wireless circuitry. The wireless circuitry may be used to support wireless communications in multiple wireless communications bands. The wireless circuitry may include antennas. Antennas may be formed from electrical components such as displays, touch sensors, near-field communications antennas, wireless power coils, peripheral antenna resonating elements, conductive traces, and device housing structures, as examples.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or the rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc. Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 15. Strap 15 may be used to hold device 10 against a user's wrist (as an example). Strap 15 may sometimes be referred to herein as wrist strap 15. In the example of FIG. 1, wrist strap 15 is connected to opposing sides 8 of device 10. Conductive housing sidewalls 12W on sides 8 of device 10 may include attachment structures for securing wrist strap 15 to housing 12 (e.g., lugs or other attachment mechanisms that configure housing 12 to receive wrist strap 15). Configurations that do not include straps may also be used for device 10.

Figure 2:
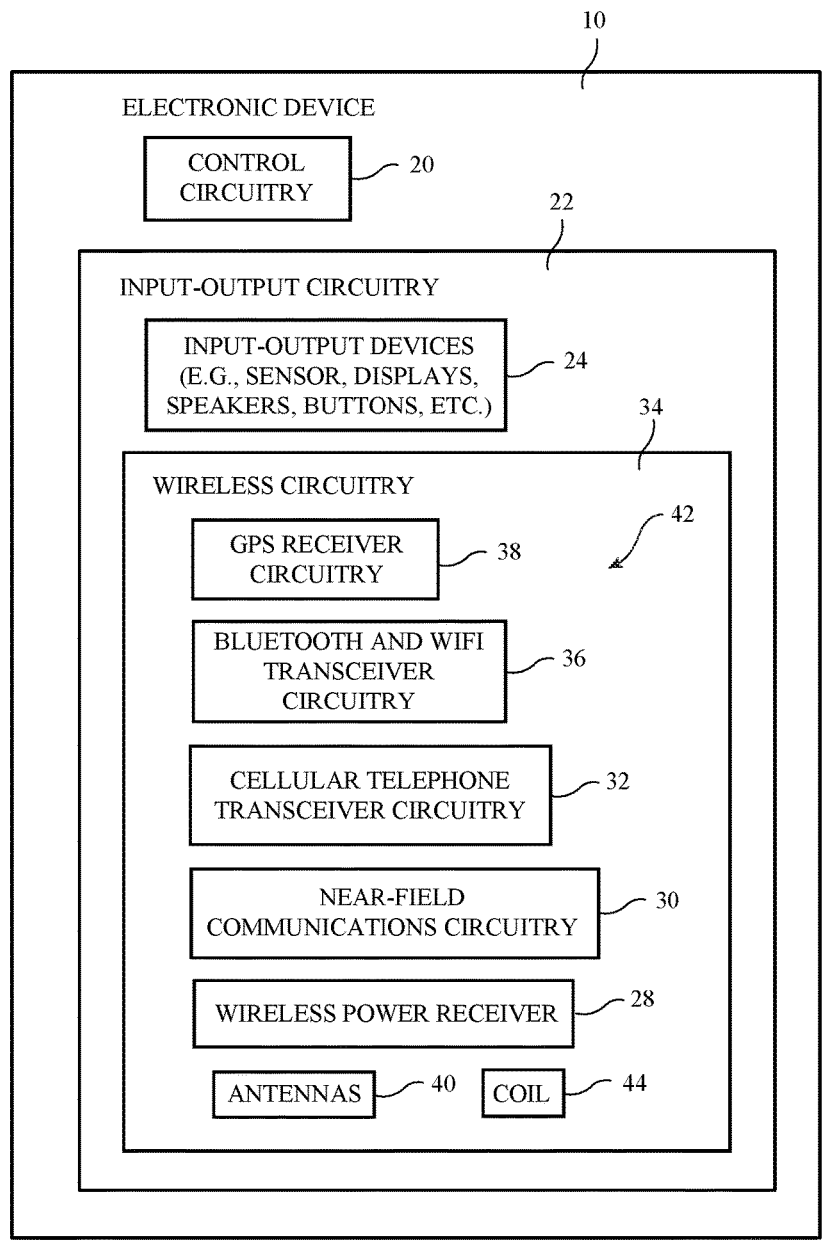
FIG. 2 is a schematic diagram of an illustrative electronic device with wireless circuitry in accordance with an embodiment.

A schematic diagram showing illustrative components that may be used in device 10 is shown in FIG. 2. As shown in FIG. 2, device 10 may include storage and processing circuitry such as control circuitry 20. Control circuitry 20 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. This processing circuitry may be based on one or more microprocessors, microcontrollers, digital signal processors, application specific integrated circuits, etc.

Control circuitry 20 may be used to run software on device 10, such as internet browsing applications, voice-over-internet-protocol (VOIP) telephone call applications, email applications, media playback applications, operating system functions, etc. To support interactions with external equipment, control circuitry 20 may be used in implementing communications protocols. Communications protocols that may be implemented using control circuitry 20 include internet protocols, wireless local area network (WLAN) protocols (e.g., IEEE 802.11 protocols—sometimes referred to as WiFi®), protocols for other short-range wireless communications links such as the Bluetooth® protocol or other wireless personal area network (WPAN) protocols, cellular telephone protocols, MIMO protocols, antenna diversity protocols, satellite navigation system protocols, etc.

Device 10 may include input-output circuitry 22. Input-output circuitry 22 may include input-output devices 24. Input-output devices 24 may be used to allow data to be supplied to device 10 and to allow data to be provided from device 10 to external devices. Input-output devices 24 may include user interface devices, data port devices, and other input-output components. For example, input-output devices 24 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include coil 44 and wireless power receiver 28 for receiving wirelessly transmitted power from a wireless power adapter. Wireless power receiver 28 may include, for example, rectifier circuitry and other circuitry for powering or charging a battery on device 10 using wireless power received by coil 44. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 42 for handling various radio-frequency communications bands. For example, wireless circuitry 34 may include transceiver circuitry 38, 36, 32, and 30. Transceiver circuitry 36 may be wireless local area network transceiver circuitry. Transceiver circuitry 36 may handle 2.4 GHz and 5 GHz bands for WiFi® (IEEE 802.11) communications or other WLAN bands and may handle the 2.4 GHz Bluetooth® communications band or other WPAN bands. Transceiver circuitry 36 may sometimes be referred to herein as WLAN transceiver circuitry 36.

Wireless circuitry 34 may use cellular telephone transceiver circuitry 32 (sometimes referred to herein as cellular transceiver circuitry 32) for handling wireless communications in frequency ranges (communications bands) such as a low band (sometimes referred to herein as a cellular low band LB) from 600 to 960 MHz, a midband (sometimes referred to herein as a cellular midband MB) from 1400 MHz or 1700 MHz to 2170 or 2200 MHz, and a high band (sometimes referred to herein as a cellular high band HB) from 2200 or 2300 to 2700 MHz (e.g., a high band with a peak at 2400 MHz) or other communications bands between 600 MHz and 4000 MHz or other suitable frequencies (as examples). Cellular transceiver circuitry 32 may handle voice data and non-voice data.

Wireless circuitry 34 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 30 (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® or Bluetooth® communications band at 5.0 GHz, and one or more cellular telephone communications bands such as a cellular midband between about 1700 MHz and 2200 MHz. If desired, a combination of antennas for covering multiple frequency bands and dedicated antennas for covering a single frequency band may be used.

It may be desirable to implement at least some of the antennas in device 10 using portions of electrical components that would otherwise not be used as antennas and that support additional device functions. As an example, it may be desirable to induce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10.

Figure 3:
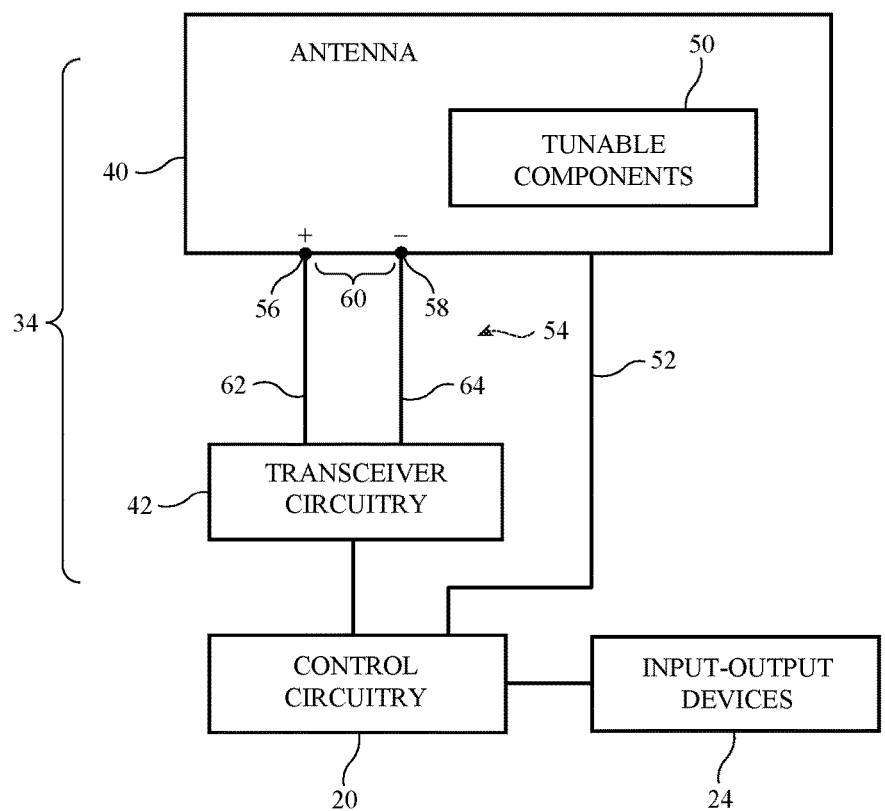
FIG. 3 is a diagram of illustrative wireless circuitry in an electronic device in accordance with an embodiment.

FIG. 3 is a diagram showing how transceiver circuitry 42 in wireless circuitry 34 may be coupled to antenna structures of a corresponding antenna 40 using signal paths such as signal path 54. Wireless circuitry 34 may be coupled to control circuitry 20. Control circuitry 20 may be coupled to input-output devices 24. Input-output devices 24 may supply output from device 10 and may receive input from sources that are external to device 10.

To provide antenna 40 with the ability to cover communications bands (frequencies) of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 50 to tune the antenna over communications bands of interest. Tunable components 50 may include tunable inductors, tunable capacitors, or other tunable components. Tunable components such as these may be based on switches and networks of fixed components, distributed metal structures that produce associated distributed capacitances and inductances, variable solid-state devices for producing variable capacitance and inductance values, tunable filters, or other suitable tunable structures.

During operation of device 10, control circuitry 20 may issue control signals on one or more paths such as path 52 that adjust inductance values, capacitance values, or other parameters associated with tunable components 50, thereby tuning antenna 40 to cover desired communications bands.

Signal path 54 may include one or more radio-frequency transmission lines. As an example, signal path 54 of FIG. 3 may be a transmission line having first and second conductive paths such as paths 62 and 64, respectively. Path 62 may be a positive signal line and path 64 may be a ground signal line. Lines 62 and 64 may form part of a coaxial cable, a stripline transmission line, a microstrip transmission line, an edge-coupled microstrip transmission line, an edge-coupled stripline transmission line, a waveguide structure, a transmission line formed from combinations of these structures, etc. Signal path 54 may sometimes be referred to herein as radio-frequency transmission line 54 or transmission line 54.

Transmission lines in device 10 such as transmission line 54 may be integrated into rigid and/or flexible printed circuit boards. In one suitable arrangement, transmission lines such as transmission line 54 may also include transmission line conductors (e.g., positive signal line 62 and ground signal line 64) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network formed from components such as inductors, resistors, and capacitors may be used in matching the impedance of antenna 40 to the impedance of transmission line 54. Matching network components may be provided as discrete components (e.g., surface mount technology components) or may be formed from housing structures, printed circuit board structures, traces on plastic supports, etc. Matching network components may, for example, be interposed on transmission line 54. The matching network components may be adjusted using control signals received from control circuitry 20 if desired. Components such as these may also be used in forming filter circuitry in antenna 40 (e.g., tunable components 50).

Transmission line 54 may be directly coupled to an antenna resonating element and ground for antenna 40 or may be coupled to near-field-coupled antenna feed structures that are used in indirectly feeding a resonating element for antenna 40. As an example, antenna 40 may be a slot antenna, an inverted-F antenna, a loop antenna, a patch antenna, or other antenna having an antenna feed 60 with a positive antenna feed terminal such as terminal 56 and a ground antenna feed terminal such as terminal 58. Positive signal line 62 may be coupled to positive antenna feed terminal 56 and ground signal line 64 may be coupled to ground antenna feed terminal 58.

If desired, antenna 40 may include an antenna resonating element that is indirectly fed using near-field coupling. In a near-field coupling arrangement, transmission line 54 is coupled to a near-field-coupled antenna feed structure that is used to indirectly feed antenna structures such as the antenna resonating element. This example is merely illustrative and, in general, any desired antenna feeding arrangement may be used.

Electronic device 10 may include multiple antennas 40 for covering multiple different communications bands. As an example, each antenna 40 may cover different respective communications bands or two or more antennas 40 may cover one or more of the same communications bands.

If desired, multiple antennas 40 in device 10 may be controlled using an antenna diversity scheme. In the antenna diversity scheme, two or more antennas 40 may be capable of covering a given communications band (e.g., where antennas 40 are mounted at different locations within device 10 for spatial diversity, exhibit different radiation patterns for pattern diversity, and/or exhibit different polarizations for polarization diversity). Control circuitry 20 may determine which antenna 40 is to be used in performing wireless communications in the given communications band at any particular time. For example, the antenna 40 that exhibits optimal wireless performance in the given communications band at a particular time may be selected to perform wireless communications in the given communications band while the other antennas 40 are switched out of use for covering the given communications band.

In this way, even if external objects in the vicinity of device 10 or other environmental factors deteriorate wireless performance for one antenna in the given communications band, a different antenna that offers superior wireless performance in the given communications band may be switched into use to cover the given communications band. If desired, the antenna that is switched out of use for the given communications band may still perform wireless communications in other communications bands. The antenna that is switched into use for covering the given communications band may also concurrently perform wireless communications in other communications bands if desired. Combining antennas that are capable of covering multiple frequency bands with an antenna diversity scheme may allow device 10 to maintain optimal wireless performance across many different communications bands regardless of the environmental conditions for device 10 while also minimizing the amount of space consumed by antennas 40 in device 10.

Figure 4:
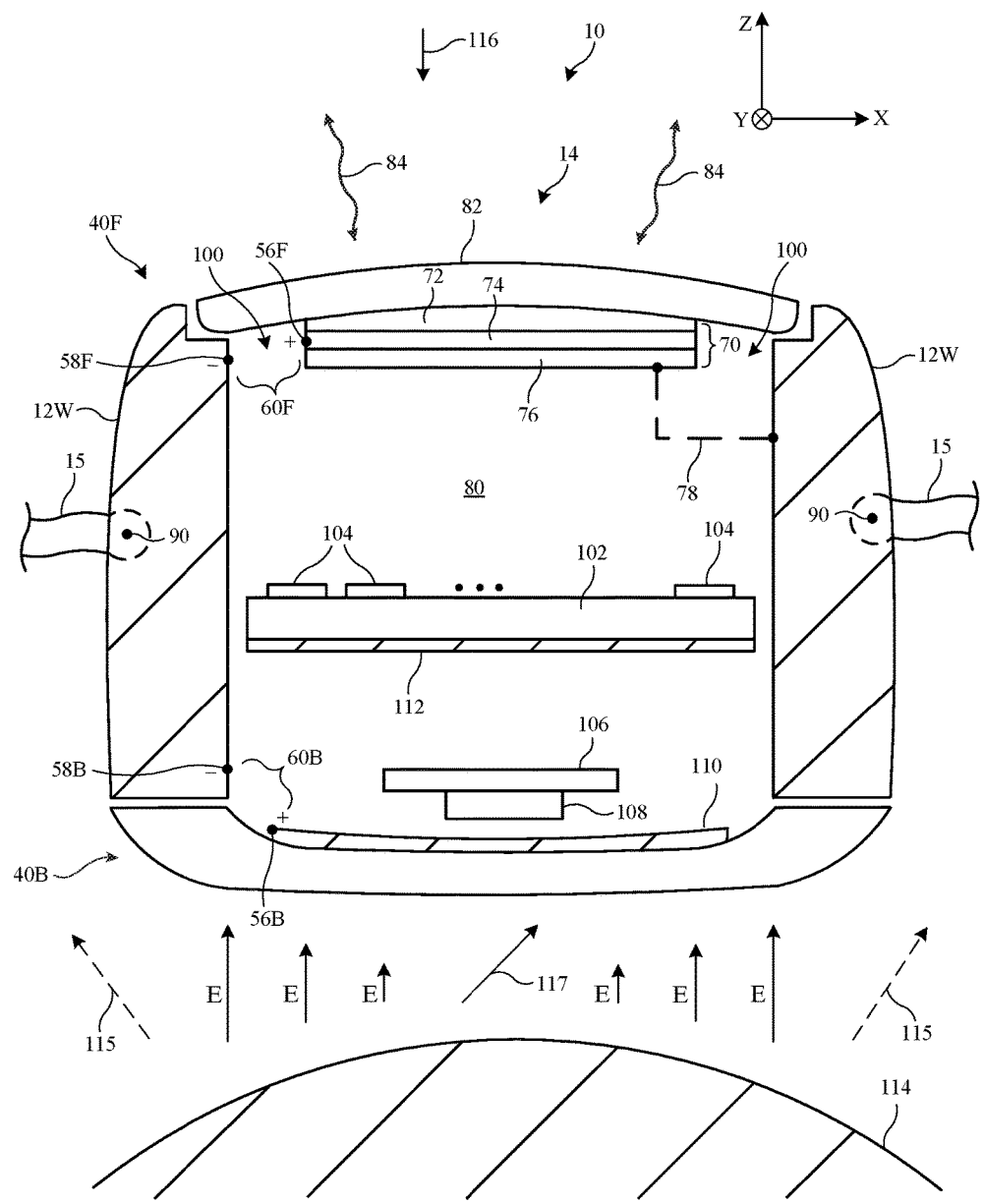
FIG. 4 is a cross-sectional side view of an illustrative electronic device having antennas formed at opposing front and rear sides of the electronic device in accordance with an embodiment.

FIG. 4 is a cross-sectional side view of electronic device 10 showing how multiple antennas 40 may be integrated within device 10 for implementing an antenna diversity scheme while also covering multiple communications bands. The plane of the page of FIG. 4 may be, for example, the X-Z plane of FIG. 1.

As shown in FIG. 4, device 10 may include at least two antennas 40 such as a first antenna 40F mounted at the front (top) side of device 10 and a second antenna 40B mounted at the rear (bottom) side of device 10. Antenna 40F may sometimes be referred to herein as front antenna 40F, front side antenna 40F, display antenna 40F, or front side module antenna 40F. Antenna 40B may sometimes be referred to herein as rear antenna 40B, rear side antenna 40B, back antenna 40B, back side antenna 40B, or back side module antenna 40B.

Display 14 may form the front face of device 10 whereas rear housing wall 12R forms the rear face of device 10. In the example of FIG. 4, rear housing wall 12R is formed from a dielectric material such as glass, sapphire, ceramic, or plastic. Conductive housing sidewalls 12W may extend from the rear face to the front face of device 10 (e.g., from rear housing wall 12R to display 14).

Strap 15 may be secured to conductive housing sidewalls 12W using corresponding attachment structures 90. Attachment structures 90 may include lugs, spring structures, clasp structures, adhesive structures, or any other desired attachment mechanisms. Strap 15 may be formed using any desired materials (e.g., metal materials, dielectric materials, or combinations of metal and dielectric materials). If desired, strap 15 may be removed from attachment structures 90 (e.g., so that a user of device 10 can swap in different straps having similar or different materials).

Display 14 may include a display module 70 (sometimes referred to herein as display stack 70, display assembly 70, or active area 70 of display 14) and a display cover layer 82. Display module 70 may, for example, form an active area or portion of display 14 that displays images and/or receives touch sensor input. The lateral portion of display 14 that does not include display module 70 (e.g., portions of display 14 formed from display cover layer 82 but without an underlying portion of display module 70) may sometimes be referred to herein as the inactive area or portion of display 14 because this portion of display 14 does not display images or gather touch sensor input.

Display module 70 may include conductive components (sometimes referred to herein as conductive display structures) that are used in forming portions of front antenna 40F. Other conductive structures in device 10 such as conductive housing sidewalls 12W may also form portions of front antenna 40F.

The conductive display structures in display module 70 may, for example, have planar shapes (e.g., planar rectangular shapes, planar circular shapes, etc.) and may be formed from metal and/or other conductive material that carries antenna currents for front antenna 40F. The thin planar shapes of these components and the stacked configuration of FIG. 4 may, for example, capacitively couple these components to each other so that they may operate together at radio frequencies to effectively/electrically form a single conductor.

Conductive display structures in display module 70 may include, for example, planar components on one or more display layers in display module 70 such as a first display layer 76, a second display layer 74, a third display layer 72, or other desired layers. As one example, display layer 72 may form a touch sensor for display 14, display layer 74 may form a display panel (sometimes referred to as a display, display layer, or pixel array) for display 14, and display layer 76 may form a near-field communications antenna for device 10 and/or other circuitry for supporting near-field communications (e.g., at 13.56 MHz).

The touch sensor formed from display layer 72 may be a capacitive touch sensor and may be formed from a polyimide substrate or other flexible polymer layer with transparent capacitive touch sensor electrodes (e.g., indium tin oxide electrodes), for example. The display panel formed from display layer 74 may be an organic light-emitting diode display layer or other suitable display layer (e.g., display pixel circuitry may be formed in display layer 74). The near-field communications antenna formed from display layer 76 may be formed from a flexible layer that includes a magnetic shielding material (e.g., a ferrite layer or other magnetic shielding layer) and that includes loops of metal traces. If desired, a conductive back plate, metal shielding cans or layers, and/or a conductive display frame may be formed under and/or around display layer 76 and may provide structural support and/or a grounding reference for the components of display module 70.

Conductive material in display layers 72, 74, and 76, a conductive back plate for display 14, conductive shielding layers, conductive shielding cans, and/or a conductive frame for display 14 may be used in forming conductive display structures that form a part of front antenna 40F (e.g., a part of the antenna resonating element and/or ground plane for front antenna 40F). Conductive display structures from different display layers in display module 70 may be coupled together using conductive traces, vertical conductive interconnects or other conductive interconnects, and/or via capacitive coupling, for example.

Display cover layer 82 may be formed from an optically transparent dielectric such as glass, sapphire, ceramic, or plastic. Display module 70 may display images (e.g., emit image light) through display cover layer 82 for view by a user and/or may gather touch or force sensor inputs through display cover layer 82. If desired, portions of display cover layer 82 may be provided with opaque masking layers (e.g., ink masking layers) and/or pigment to obscure interior 80 of device 10 from view of the user.

Substrates such as substrate 102 (e.g., a rigid or flexible printed circuit board, integrated circuit or chip, integrated circuit package, etc.) may be located within interior 80 of device 10. Substrate 102 may be, for example, a main logic board (MLB) for device 10. Other components such as components 104 (e.g., components used in forming control circuitry 20 and/or input-output circuitry 22 of FIG. 2) may be mounted to substrate 102 and/or elsewhere within interior 80 of device 10.

Display module 70 may be laterally separated from conductive housing sidewalls 12W by a dielectric-filled slot such as slot 100 (sometimes referred to herein as gap or opening 100). Slot 100 may be filled with air and/or solid dielectric materials such as plastic, dielectric portions of display 14, glass, ceramic, etc. Slot 100 may extend around some or all of the lateral sides of display module 70 (e.g., in the X-Y plane of FIG. 4). If desired, the conductive display structures in display module 70 may be shorted to conductive housing sidewalls 12W at one or more locations over optional conductive path 78 across slot 100.

Front antenna 40F may be fed using an antenna feed 60F having a positive antenna feed terminal 56F and a ground antenna feed terminal 58F coupled across slot 100. For example, positive antenna feed terminal 56F may be coupled to conductive display structures in display module 70 whereas ground antenna feed terminal 58F is coupled to a given conductive housing sidewall 12W. This is merely illustrative and, if desired, positive antenna feed terminal 56F may be coupled to conductive housing sidewalls 12W and ground antenna feed terminal 58F may be coupled to display module 70. Antenna feed 60F may be coupled to transceiver circuitry in device 10 using a corresponding transmission line (e.g., to transceiver circuitry 42 over a corresponding transmission line 54 as shown in FIG. 3). Antenna currents for front antenna 40F may be conveyed by antenna feed 60F and may flow over the conductive display structures in display module 70 and conductive housing sidewalls 12W. In this way, front antenna 40F may be formed at or adjacent to the front face or side of device 10.

When configured in this way, slot 100 may form a radiating slot (e.g., a slot antenna resonating element) for front antenna 40F. Slot 100 (i.e., front antenna 40F) may be used to transmit and receive radio-frequency signals 84 in WLAN and/or WPAN bands at 2.4 GHz and 5.0 GHz, in a cellular midband between 1.7 GHz and 2.2 GHz, and in a satellite navigation bands at 1575 MHz through display cover layer 82, as one example.

Rear antenna 40B may also be used to cover one or more of these communications bands (e.g., for performing wireless communications using an antenna diversity scheme with front antenna 40F). As shown in FIG. 4, substrate 102 may include one or more conductive layers such as conductive layer 112. Conductive layer 112 may, for example, form a portion of the antenna ground for rear antenna 40B. Conductive layer 112 may therefore sometimes be referred to herein as grounded layer 112, ground layer 112, ground plane 112, ground conductor 112, or grounded conductor 112.

If desired, conductive layer 112 may be shorted (grounded) to conductive housing sidewalls 12W (e.g., the antenna ground for rear antenna 40B may include conductive layer 112 and conductive housing sidewalls 12W). Conductive layer 112 may be formed using metal foil, stamped sheet metal, conductive traces patterned onto a surface of substrate 102, a conductive trace on a flexible printed circuit mounted to substrate 102, metal housing portions, and/or from any other desired conductive structures. If desired, conductive layer 112 may be formed (embedded) within substrate 102 (e.g., conductive layer 112 may be stacked between dielectric layers of substrate 102). In another suitable arrangement, conductive layer 112 may be omitted.

As shown in FIG. 4, rear housing wall 12R may extend across substantially all of the length and width of device 10. Rear housing wall 12R may be formed from any desired dielectric material. For example, rear housing wall 12R may be formed from plastic, glass, sapphire, ceramic, wood, polymer, combinations of these materials, or any other desired dielectrics. Rear housing wall 12R may be optically opaque or optically transparent or may include both optically opaque and optically transparent portions (e.g., rear housing wall 12R may include optically transparent windows in an otherwise optically opaque member).

Rear antenna 40B may include conductive structures 110. Conductive structures 110 may, for example, form some or all of an antenna resonating element for rear antenna 40B (e.g., an inverted-F antenna resonating element arm, a planar inverted-F antenna resonating element, a patch antenna resonating element, a dipole antenna resonating element, a monopole antenna resonating element, the edges of a slot antenna resonating element, etc.).

In one suitable arrangement, conductive structures 110 may be formed from conductive traces that are patterned directly onto the interior surface of rear housing wall 12R (e.g., the patterned conductive traces may be in direct contact with the inner surface of rear housing wall 12R). In another suitable arrangement, conductive structures 110 may be formed using conductive foil, stamped sheet metal, or other conductive structures that are placed over and in direct contact with rear housing wall 12R. In yet another suitable arrangement, conductive structures 110 may be formed from conductive traces on a flexible or rigid printed circuit substrate or other dielectric substrate that is located over (e.g., vertically separated from and overlapping) or that is in direct contact with rear housing wall 12R. If desired, springs, clips, or other biasing structures may be used to exert a downward force on conductive structures 110 that serves to press conductive structures 110 towards, into, or onto rear housing wall 12R. If desired, adhesive may be used to adhere conductive structures 110 onto rear housing wall 12R. Ink or other opaque masking layers may be interposed between conductive structures 110 and rear housing wall 12R or rear housing wall 12R may be opaque or provided with pigment that obscures conductive structures 110 from view through the rear of device 10, if desired. Conductive structures 110 may be formed using any desired conductive materials (e.g., aluminum, copper, metal alloys, stainless steel, gold, etc.). In this way, conductive structures 110 used in forming the antenna resonating element for rear antenna 40B and thus rear antenna 40B itself may be formed at or adjacent to the rear face or side of device 10 (e.g., at or adjacent to rear housing wall 12R).

If desired, conductive structures 110 may conform to the shape of the interior surface of rear housing wall 12R. In the example of FIG. 4, the interior surface of rear housing wall 12R and thus conductive structures 110 have a slightly curved or concave shape (e.g., to increase the total volume for components within device 10 relative to scenarios where the interior surface of rear housing wall 12R is flat).

The example of FIG. 4 in which rear housing wall 12R is formed using dielectric materials is merely illustrative. If desired, rear housing wall 12R of device 10 may include a combination of conductive and dielectric materials. For example, a portion of rear housing wall 12R may be formed from metal whereas another portion of rear housing wall 12R is formed from dielectric (e.g., the portion of rear housing wall 12R formed from dielectric may extend across some but not all of the length and width of device 10). The dielectric portion of rear housing wall 12R may, for example, include a dielectric window within a conductive portion of rear housing wall 12R (e.g., rear housing wall 12R may include a metal frame for the dielectric portion of rear housing wall 12R or other structures that surround the dielectric portion of rear housing wall 12R). Rear housing wall 12R may include multiple dielectric windows if desired.

Rear antenna 40B may be fed using an antenna feed 60B having a positive antenna feed terminal 56B and a ground antenna feed terminal 58B coupled between conductive structures 110 and conductive housing sidewalls 12W. Positive antenna feed terminal 56B may be coupled to conductive structures 110 whereas ground antenna feed terminal 58B is coupled to conductive housing sidewalls 12W. This example is merely illustrative. If desired, ground antenna feed terminal 58B may be coupled to conductive layer 112 or any other grounded structures within device 10. In another suitable arrangement, positive antenna feed terminal 56B may be coupled to conductive housing sidewalls 12W or conductive layer 112 whereas ground antenna feed terminal 58B is coupled to conductive structures 110.

Antenna feed 60B may be coupled to transceiver circuitry in device 10 using a corresponding transmission line (e.g., to transceiver circuitry 42 over a corresponding transmission line 54 as shown in FIG. 3). If desired, conductive structures 110 may be shorted to the antenna ground for rear antenna 40B (e.g., to conductive housing sidewalls 12W, conductive layer 112, and/or other grounded structures) using conductive paths (not shown in FIG. 4 for the sake of clarity). Such conductive paths may, for example, form a return (short) path for rear antenna 40B (e.g., in scenarios where rear antenna 40B is an inverted-F antenna or planar inverted-F antenna). Antenna currents for rear antenna 40B may be conveyed by antenna feed terminals 56B and 58B and may flow over conductive structures 110, conductive housing sidewalls 12W, and/or conductive layer 112, for example.

Rear antenna 40B may transmit and receive radio-frequency signals through rear housing wall 12R in one or more of the communications bands that are also covered by front antenna 40F. In one suitable arrangement, rear antenna 40B may transmit and receive radio-frequency signals in the same cellular telephone communications band as front antenna 40F (e.g., in a cellular midband between approximately 1700 MHz and 2200 MHz). Control circuitry 20 (FIGS. 2 and 3) in device 10 may control front antenna 40F and rear antenna 40B using an antenna diversity scheme. Under the antenna diversity scheme, control circuitry 20 may select a given one of front antenna 40F and rear antenna 40B to convey radio-frequency signals in the cellular telephone communications band at a given time (e.g., a given one of antennas 40F and 45B having optimal wireless performance in the cellular telephone communications band).

Radio-frequency signals transmitted by rear antenna 40B may be shielded from electrical components 104 and front antenna 40F by conductive layer 112 and substrate 102, for example. Similarly, conductive layer 112 and substrate 102 may shield rear antenna 40B from components 104 and front antenna 40F, thereby mitigating electromagnetic interference between rear antenna 40B, components 104, and front antenna 40F.

If desired, other components such as components 108 may be mounted at or adjacent to rear housing wall 12R. Components 108 may include one or more sensors such as a light sensor, proximity sensor, or touch sensor, and/or may include coil 44 (FIG. 2), as an example. Components 108 may be mounted to substrate 106 or to substrate 102. Components 108 may be vertically separated from rear housing wall 12R, may be pressed against (e.g., in direct contact with) rear housing wall 12R, or may be mounted to rear housing wall 12R. In scenarios where components 108 are present, conductive structures 110 for rear antenna 40B may laterally surround or be distributed around the periphery of components 108 at rear housing wall 12R (e.g., conductive structures 110 may include a hole or opening that is aligned with components 108). If desired, optically transparent windows in rear housing wall 12R may be aligned with components 108 to allow light (e.g., visible light, infrared light, etc.) to pass to and/or from components 108 through rear housing wall 12R.

As one example, components 108 may include at least one infrared light emitter, at least one infrared light sensor, and coil 44 (FIG. 2). In this example, coil 44 may laterally surround the infrared light sensor and emitter. The infrared light emitter may emit infrared light through rear housing wall 12R (e.g., through a transparent window in rear housing wall 12R). The infrared light sensor may receive a reflected version of the emitted infrared light that has been reflected off of an external object in the vicinity of device 10 such as wrist 114 of a user (e.g., a user who is wearing device 10 on their wrist in scenarios where device 10 is a wristwatch). Coil 44 in components 108 may receive wireless power from a wireless power adapter (e.g., a wireless charging device) through rear housing wall 12R. This example is merely illustrative and, if desired, components 108 may include any other desired components or may be omitted.

By forming rear antenna 40B at rear housing wall 12R, the vertical height of device 10 (e.g., parallel to the Z-axis of FIG. 4) may be shorter than would otherwise be possible in scenarios where the corresponding antenna resonating element is located elsewhere on device 10 (while still allowing rear antenna 40B to exhibit satisfactory antenna efficiency). As an example, the vertical height of device 10 may be less than or equal to 11.4 mm, less than 15 mm, between 8 and 11.4 mm, or any other desired height while still allowing rear antenna 40B to operate with satisfactory antenna efficiency. Maximizing the vertical separation between front antenna 40F and rear antenna 40B by forming front antenna 40F from display 14 and forming rear antenna 40B at rear housing wall 12R and shielding antennas 40F and 40B using conductive structures such as conductive layer 112 may also allow for such a reduction in the vertical height of device 10 while still allowing front antenna 40F to operate with satisfactory antenna efficiency.

In practice, the wireless performance of rear antenna 40B may be optimized by the presence of an external object adjacent to rear housing wall 12R. For example, the presence of the user's wrist 114 adjacent to rear housing wall 12R when the user is wearing device 10 may enhance the wireless performance of rear antenna 40B. During operation, the antenna resonating element for rear antenna 40B (e.g., conductive structures 110) may transmit and/or receive radio-frequency signals having electric fields (E) that are oriented normal to the surfaces of rear housing wall 12R and wrist 114. These signals may sometimes be referred to as surface waves, which are then propagated along the surface of wrist 114 and outwards, as shown by paths 115 (e.g., conductive structures 110 and wrist 114 may serve as a waveguide that directs the surface waves outwards). This may allow the radio-frequency signals conveyed by rear antenna 40B to be properly received by external communications equipment (e.g., a wireless base station) even though rear antenna 40B is located close to wrist 114 and typically pointed away from the external communications equipment.

In practice, the wireless performance of rear antenna 40B within cellular telephone communications bands may be particularly sensitive to variations in impedance loading through rear housing wall 12R. When performing wireless communications operations, rear antenna 40B may be loaded through rear housing wall 12R by external objects such as wrist 114 in the vicinity of rear housing wall 12R. If care is not taken, rear antenna 40B may exhibit an altered frequency response relative to a free space environment when an external object such wrist 114 is brought into the vicinity of rear antenna 40B (e.g., rear antenna 40B may be detuned because the impedance of the antenna has been changed due to loading from wrist 114 through rear housing wall 12R). In addition, different types of objects or materials may load rear antenna 40B by differing amounts. Similarly, adjustments to the orientation or distance of the external object with respect to rear housing wall 12R may load rear antenna 40B by different amounts. During normal operation of device 10 by a user, these loading variations may occur when the user adjusts the location or orientation of device 10 on their wrist, when the user adjusts the distance between their wrist and rear antenna 40B (e.g., by tightening or loosening strap 15), when the user swaps out strap 15 for a different strap, when a different user wears device 10 (e.g., because different users may have different wrist physiologies that affect the loading of rear antenna 40B differently), when strap 15 or wrist 114 becomes wet (e.g., with sweat or water such as when the user is swimming while wearing device 10), or when a part of the user's clothing such as a shirt sleeve is placed between or removed from between device 10 and wrist 114, as examples. These examples are merely illustrative. In general, any environmental factors may load rear antenna 40B by different amounts through rear housing wall 12R.

Such environmental loading variations may alter the impedance of rear antenna 40B relative to its corresponding transmission line 54 (FIG. 3). If care is not taken, these variations may generate an impedance discontinuity between rear antenna 40B and the rest of wireless circuitry 34. The impedance discontinuity may cause some radio-frequency energy to be reflected at the boundary between rear antenna 40B and the rest of wireless communications circuitry 34 instead of being used to convey signals with external communications equipment. If these environmental loading variations are not compensated for, rear antenna 40B may become detuned as the environmental loading variations change over time, thereby reducing the overall antenna efficiency and communications link quality during normal operation of device 10.

In order to compensate for these antenna impedance changes, control circuitry 20 (FIG. 3) may control adjustable matching circuitry coupled to rear antenna 40B to ensure that rear antenna 40B is suitably matched to the rest of wireless circuitry 34 regardless of how rear antenna 40B is loaded through rear housing wall 12R. If desired, control circuitry 20 may adjust tunable components 50 (FIG. 3) in addition to adjustable matching circuitry to cover the desired frequency bands of interest and to compensate for any detuning of rear antenna 40B due to loading of the antenna by external objects.

However, in practice, adjusting impedance matching circuitry and tunable components 50 may not be sufficient to compensate for changes in loading within some cellular telephone communications bands such as the cellular midband. In these scenarios, control circuitry 20 may control front antenna 40F to handle the cellular telephone communications band instead of rear antenna 40B (e.g., using an antenna diversity scheme). Front antenna 40F may, for example, be more immune to changes in loading through rear housing wall 12R than rear antenna 40B. By switching front antenna 40F into use for handling the cellular telephone communications band, satisfactory communications in the cellular telephone communications band may be maintained even if rear antenna 40B has become unsatisfactorily detuned. In free space, rear antenna 40B may exhibit greater efficiency and bandwidth in the cellular telephone communications band than front antenna 40F (e.g., because rear antenna 40B need only cover the cellular telephone communications band and not the wireless local area network and satellite navigation bands that are also covered by front antenna 40F). Rear antenna 40B may therefore be switched back into use once its wireless performance in the cellular telephone communications band returns to a satisfactory level, if desired.

Figure 5:
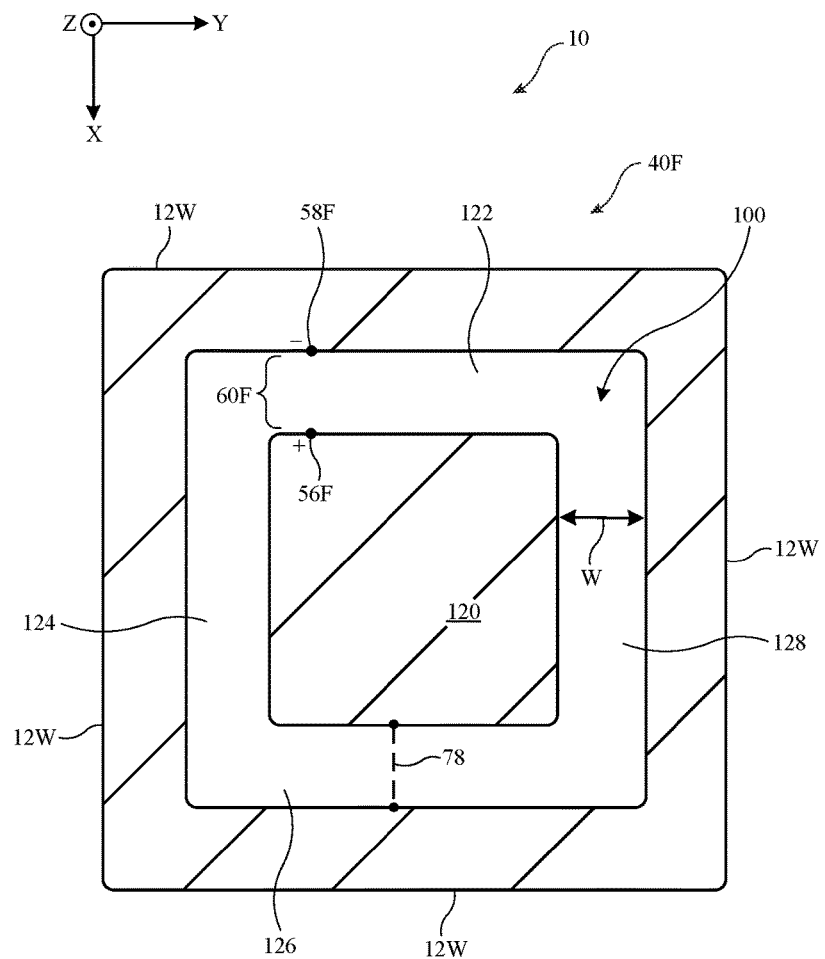
FIG. 5 is a top-down view of an illustrative antenna formed at the front side of an electronic device of the type shown in FIG. 4 in accordance with an embodiment.

FIG. 5 is a top-down of device 10 view showing how front 40F be integrated within device 10 (e.g., as taken in the direction of arrow 116 of FIG. 4). The plane of the page of FIG. 5 may, for example, lie within the X-Y plane of FIG. 4. In the example of FIG. 5, display cover layer 82 of FIG. 4 is not shown for the sake of clarity.

As shown in FIG. 5, slot 100 of front antenna 40F may follow a meandering path and may have edges defined by different conductive electronic device structures. Slot 100 may have a first set of edges (e.g., outer edges) defined by conductive housing sidewalls 12W and a second set of edges (e.g., inner edges) defined by conductive structures such as conductive display structures 120. Conductive display structures 120 may, for example, include conductive portions of display module 70 (FIG. 4) such as metal portions of a frame or assembly of display 14, touch sensor electrodes within display layer 72, pixel circuitry within display layer 74, portions of a near field communications antenna embedded within display layer 76, ground plane structures within display 14, a metal back plate for display 14, or other conductive structures on or in display 14.

In the example of FIG. 5, slot 100 follows a meandering path and has a first segment 124 between edge the left conductive housing sidewall 12W and conductive display structures 120, a second segment 122 between the top conductive housing sidewall 12W and conductive display structures 120, a third segment 128 between the right conductive housing sidewall 12W and conductive display structures 120, and a fourth segment 126 between the bottom conductive housing sidewall 12W and conductive display structures 120. Segments 124 and 128 may extend along parallel longitudinal axes. Segments 122 and 126 may extend between ends of segments 124 and 128 (e.g., along parallel longitudinal axes perpendicular to the longitudinal axes of segments 124 and 128). In this way, slot 100 may be an elongated slot that extends between conductive display structures 120 and multiple conductive housing sidewalls 12W (e.g., to maximize the length of slot 100 for covering relatively low frequency bands such as satellite navigation communications bands and low band cellular telephone communications bands).

Front antenna 40F may be fed using antenna feed 60F coupled across width W of slot 100 (e.g., a width W extending perpendicular to the elongated length of slot 100). In the example of FIG. 5, antenna feed 60F is coupled across segment 122 of slot 100. This is merely illustrative and, if desired, antenna feed 60F may be coupled across any portion of slot 100. Ground antenna feed terminal 58F of antenna feed 60F may be coupled to a given conductive housing sidewall 12W and positive antenna feed terminal 56F of antenna feed 60F may be coupled to conductive display structures 120. This is merely illustrative and, if desired, ground antenna feed terminal 58F of antenna feed 60F may be coupled to conductive display structures 120 and positive antenna feed terminal 56F of antenna feed 60F may be coupled to a given conductive housing sidewall 12W.

When configured in this way, front antenna 40F may form a slot antenna, as an example. Slot 100 may form the radiating element for front antenna 40F and may sometimes be referred to herein as slot antenna resonating element 100, slot antenna radiating element 100, slot radiating element 100, or slot element 100. Front antenna 40F may, for example, exhibit response peaks when the perimeter of slot 100 (e.g., as given by the length of the edges of slot 100 defined by conductive housing sidewalls 12W and conductive display structures 120) is approximately equal to the effective wavelength of operation of the antenna (e.g., the wavelength after accounting for dielectric effects associated with the materials in device 10). If desired, conductive paths 78 may short conductive display structures 120 to conductive housing sidewalls 12W at one or more locations to adjust the electrical length and thus the perimeter and frequency response of slot 100. Harmonic modes of slot 100, adjustable matching circuitry, optional conductive paths 78, and/or tunable components 50 of FIG. 3 coupled to antenna feed 60F or elsewhere on front antenna 40F may configure front antenna 40F to perform wireless communications in multiple communications (frequency) bands such as a satellite navigation band, a 2.4 GHz WLAN and WPAN band, a cellular telephone midband, and 5.0 GHz WLAN band. Front antenna 40F may perform wireless communications in the cellular telephone midband together with rear antenna 40B of FIG. 4 using an antenna diversity scheme if desired.

The example of FIG. 5 is merely illustrative. Slot 100 may have a uniform width W along its length or may have different widths along its length. If desired, width W may be adjusted to tweak the bandwidth of front antenna 40F. As an example, width W may be between 0.5 mm and 1.0 mm. Slot 100 may have other shapes if desired (e.g., shapes with more than three segments extending along respective longitudinal axes, fewer than three segments, curved edges, etc.). Device 10 may have any desired shape or profile.

Figure 6:
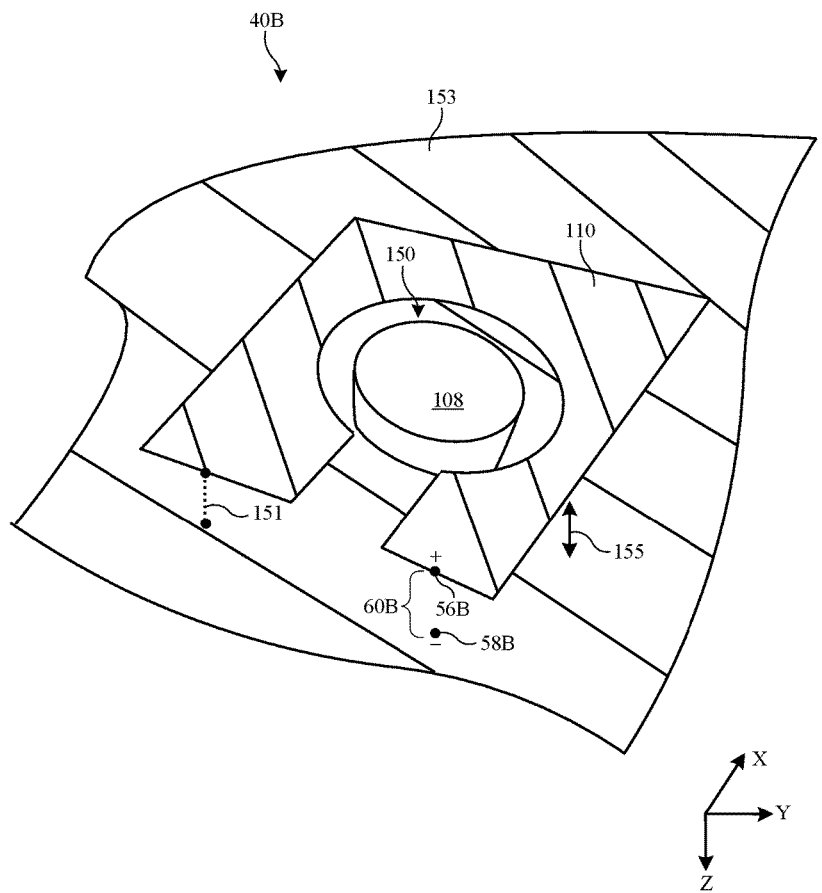
FIG. 6 is a perspective view of an illustrative antenna formed at the rear side of an electronic device of the type shown in FIG. 4 in accordance with an embodiment.

FIG. 6 is a perspective view of rear antenna 40B (e.g., as taken in the direction of arrow 117 of FIG. 4) in scenarios where conductive structures 110 of rear antenna 40B are implemented using a planar metal structure such as a metal patch (e.g., in a scenario where rear antenna 40B is implemented using a planar inverted-F or patch antenna structure). In the example of FIG. 6, rear housing wall 12R and substrate 106 of FIG. 4 are not shown for the sake of clarity.

As shown in FIG. 6, rear antenna 40B may include conductive structures 110 and antenna ground 153. Antenna ground 153 may, for example, include portions of conductive housing sidewalls 12W, conductive layer 112, and/or other grounded conductive structures within device 10 (FIG. 4). Conductive structures 110 may be substantially planar and may, if desired, conform to the shape of rear housing wall 12R of FIG. 4.

As shown in FIG. 6, conductive structures 110 may be separated from antenna ground 153 by at least distance 155. Antenna feed 60B of rear antenna 40B may be coupled across distance 155. Positive antenna feed terminal 56B may be coupled to conductive structures 110 whereas ground antenna feed terminal 58B is coupled to antenna ground 153. This is merely illustrative and, if desired, the locations of antenna feed terminals 56B and 58B shown in FIG. 6 may be reversed. If desired, positive antenna feed terminal 56B may be coupled to a feed leg of conductive structures 110 that protrudes downward towards antenna ground 153. When fed in this way, rear antenna 40B may form a patch antenna. If desired, an optional return path such as return path 151 may short conductive structures 110 to antenna ground 153 at one or more locations. In these scenarios, rear antenna 40B may form a planar inverted-F antenna, for example. Conductive structures 110 may form an antenna resonating element for rear antenna 40B and may sometimes be referred to herein as antenna resonating element 110, antenna radiating element 110, or patch 110.

In the example of FIG. 6, conductive structures 110 have a rectangular plate shape. Configurations in which conductive structures 110 have a meandering arm shape, shapes with multiple branches, one or more curved edges, one or more straight edges, or other shapes may also be used for forming the antenna resonating element of rear antenna 40B. Conductive structures 110 may be fed using other feeding schemes if desired (e.g., the antenna resonating element formed by conductive structures 110 may be a resonating element in a patch antenna, monopole antenna, dipole antenna, slot antenna, loop antenna, etc.).

As shown in the example of FIG. 6, a slot 150 may be formed in conductive structures 110 (sometimes referred to herein as notch 150 or hole 150). Slot 150 may be defined by edges of conductive structures 110. Slot 150 may be a closed slot that is completely surrounded by (e.g., enclosed by) conductive material in conductive structures 110 or may be an open slot that extends to an outer edge of conductive structures 110 (e.g., slot 150 may be formed by a cut or notch extending from one side of the outer edge of conductive structures 110 towards the interior of conductive structures 110).

Slot 150 may have any desired perimeter or shape. In the example of FIG. 6, slot 150 has a curved (e.g., circular or oval) shape. The shape of slot 150 may accommodate other components such as components 108 that are aligned with or placed within slot 150. If desired, the shape of slot 150 may be configured to conform to the shape of components 108. Components 108 may lie in a common plane with conductive structures 110 and/or may lie below the plane of conductive structures 110.

The example of FIG. 6 is merely illustrative. In general, positive antenna feed terminal 56B and optional return path 151 may be coupled to conductive structures 110 at any desired locations. Conductive structures 110 and slot 150 may have any desired shapes (e.g., shapes having one or more curved sides, one or more straight sides, etc.). When configured in this way, rear antenna 40B may convey radio-frequency signals in a desired communications band such as the cellular midband using an antenna diversity scheme with front antenna 40F of FIGS. 4 and 5. Slot 150 in rear antenna 40B may allow components 108 to transmit and/or receive wireless signals through rear housing wall 12R of FIG. 4 (e.g., without blocking the wireless signals with conductive structures 110).

Figure 7:
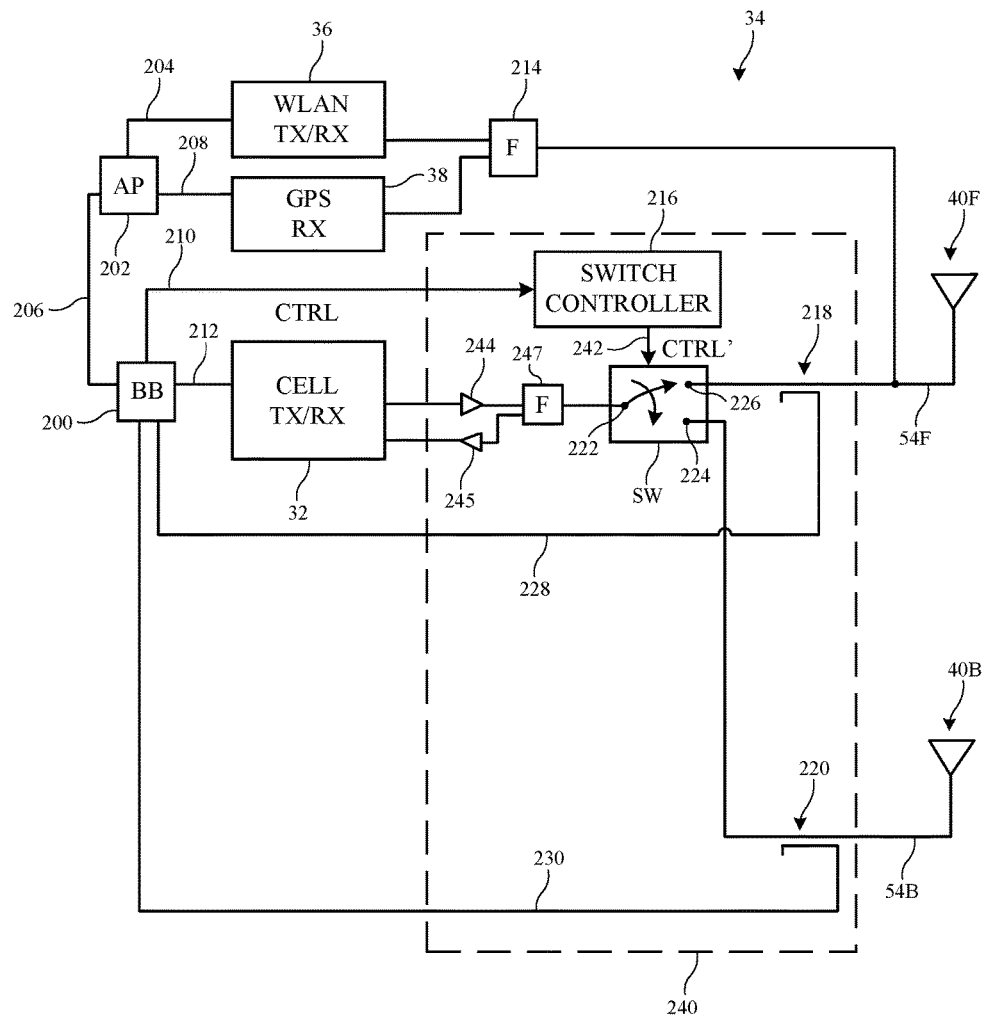
FIG. 7 is a diagram of illustrative wireless circuitry having multiple antennas that are controlled using an antenna diversity scheme in accordance with an embodiment.

FIG. 7 is a circuit diagram of wireless circuitry 34 showing how rear antenna 40B and front antenna 40F of FIGS. 4-6 may be controlled to perform wireless communications over a set of communications bands while performing wireless communications using an antenna diversity scheme over a subset of those communications bands.

As shown in FIG. 7, wireless circuitry 34 may include WLAN transceiver (TX/RX) circuitry 36, GPS receiver circuitry 38, and cellular transceiver circuitry 32. WLAN transceiver circuitry 36 may also cover WPAN communications bands if desired. WLAN transceiver circuitry 36 may be coupled to applications processor (AP) 202 over data path 204. GPS receiver circuitry 38 may be coupled to applications processor 202 over data path 208. Cellular transceiver circuitry 32 may be coupled to cellular baseband (BB) processor circuitry 200 over data path 212. Baseband processor circuitry 200 (sometimes referred to herein as baseband processor 200) may be coupled to applications processor 202 over path 206. Applications processor 202 may run operating system software or other software associated with the control and operation of device 10.

If desired, applications processor 202, baseband processor circuitry 200, cellular transceiver circuitry 32, GPS receiver circuitry 38, and WLAN transceiver circuitry 36 may each be formed on separate substrates such as separate integrated circuits, integrated circuit packages, chips, or printed circuit boards. In another suitable arrangement, two or more of applications processor 202, baseband processor circuitry 200, cellular transceiver circuitry 32, GPS receiver circuitry 38, and WLAN transceiver circuitry 36 may be formed on the same substrate such as a shared integrated circuit, integrated circuit package, chip, or printed circuit board (e.g., substrate 102 of FIG. 4).

WLAN transceiver circuitry 36 may include digital-to-analog converter circuitry, analog-to-digital converter circuitry, power amplifier circuitry, low noise amplifier circuitry, mixer circuitry (e.g., up-converter and down-converter circuitry), or other circuitry for generating radio-frequency signals in WLAN or WPAN communications bands and for receiving radio-frequency signals in WLAN or WPAN communications bands. GPS receiver circuitry 38 may include analog-to-digital converter circuitry, low noise amplifier circuitry, mixer circuitry (e.g., down-converter circuitry) or other circuitry for receiving radio-frequency signals in a satellite navigation communications band.

WLAN transceiver circuitry 36 and GPS receiver circuitry 38 may be coupled to front antenna 40F over a corresponding radio-frequency transmission line 54F. Filter (F) circuitry such as filter circuitry 214 may be coupled between WLAN transceiver circuitry 36, GPS receiver circuitry 38, and front antenna 40F. Filter circuitry 214 may serve to isolate radio-frequency signals handled by WLAN transceiver circuitry 36 from GPS signals handled by GPS receiver circuitry 38. In addition, filter circuitry 214 may block radio-frequency signals in cellular telephone communications bands from passing from front antenna 40F to WLAN transceiver circuitry 36 and GPS receiver circuitry 38. Filter circuitry 214 may include passive filtering circuitry such as duplexer circuitry, diplexer circuitry, low pass filter circuitry, high pass filter circuitry, bandpass filter circuitry, notch filter circuitry, impedance matching circuitry, etc. If desired, filter circuitry 214 may include active circuitry such as one or more switches. Front antenna 40F may transmit radio-frequency signals generated by WLAN transceiver circuitry 36 in WLAN/WPAN communications bands and may receive radio-frequency signals in WLAN/WPAN communications bands for WLAN transceiver circuitry 36. Similarly, front antenna 40F may receive radio-frequency signals in satellite navigation communications bands for GPS receiver circuitry 38.

Applications processor 202 may provide digital data to WLAN transceiver circuitry 36 over data path 204 that is used by WLAN transceiver circuitry 36 for generating radio-frequency signals in WLAN/WPAN communications bands. Applications processor 202 may receive incoming digital data from WLAN transceiver circuitry 36 over data path 204 corresponding to radio-frequency data that was received by front antenna 40F in WLAN/WPAN communications bands. Similarly, applications processor 202 may receive incoming digital data from GPS receiver circuitry 38 over data path 208 corresponding to radio-frequency data that was received by front antenna 40F in a satellite navigation communications band.

Applications processor 202 may control baseband processor circuitry 200 to generate baseband data for transmission in cellular telephone communications bands. Baseband processor circuitry 200 may pass the baseband data to cellular transceiver circuitry 32 over data path 212. Cellular transceiver circuitry 32 may include digital-to-analog converter circuitry, analog-to-digital converter circuitry, power amplifier circuitry, low noise amplifier circuitry, mixer circuitry (e.g., up-converter and down-converter circuitry), or other circuitry for generating radio-frequency signals in cellular telephone communications bands and for receiving radio-frequency signals in cellular telephone communications bands. Cellular transceiver circuitry 32 may generate radio-frequency signals in cellular telephone communications bands corresponding to the baseband data received from baseband processor circuitry 200.

Similarly, cellular transceiver circuitry 32 may receive radio-frequency signals in cellular telephone communications bands (e.g., from one of antennas 40F and 40B at a given time) and may down-convert the radio-frequency signals to generate corresponding baseband data. Cellular transceiver circuitry 32 may pass the baseband data to baseband processor circuitry 200. Incoming data that has been received by baseband processor 200 may be passed to applications processor 202 over path 206 if desired.

Cellular transceiver circuitry 32 may be coupled to antennas 40F and 40B using switching circuitry such as switch SW. The configuration of switch SW may be controlled by control signal CTRL' on switch control path 242. Control circuitry in device 10 such as baseband processor circuitry 200 may control the state of control signal CTRL' to optimize antenna performance in real time. For example, baseband processor circuitry 200 may be coupled to switch controller 216 over control path 210. Baseband processor circuitry 200 may provide a switch control signal CTRL to switch controller 216 over control path 210 that identifies the desired state for switch SW. Switch controller 216 may convert control signal CTRL into control signal CTRL' provided to switch SW over path 242. As an example, switch controller 216 may assert control signal CTRL' at a predetermined voltage level based on control signal CTRL to set switch SW to a desired state.

Switch SW may have a first terminal 222 coupled to cellular transceiver circuitry 32, a second terminal 226 coupled to front antenna 40F over transmission line 54F, and a third terminal 224 coupled to rear antenna 40B over transmission line 54B. Transmission line 54F may, for example, be coupled to antenna feed 60F of front antenna 40F (FIG. 5). Transmission line 54B may, for example, be coupled to antenna feed 60B of rear antenna 40B (FIG. 6).

Switch SW may have a first state at which terminal 226 is coupled to terminal 222 and terminal 224 is decoupled from terminal 222. In the first state, switch SW may couple cellular transceiver circuitry 32 to front antenna 40F and may decouple cellular transceiver circuitry 32 from rear antenna 40B. Switch SW may have a second state at which terminal 224 is coupled to terminal 222 and terminal 226 is decoupled from terminal 222. In the second state, switch SW may couple cellular transceiver circuitry 32 to rear antenna 40B and may decouple cellular transceiver circuitry 32 from front antenna 40F. Control signal CTRL' may control switch SW to place switch SW in a selected one of the first and second states. In this scenario, switch SW is implemented as a single-pole double-throw (SPDT) switch. This is merely illustrative. If desired, switch SW may have a third state at which terminal 222 is decoupled from both terminals 226 and 224. Switch SW may, in general, be implemented using any desired switching circuits (e.g., networks of switches, a switch matrix, etc.).

If desired, filter circuitry such as filter circuitry 247 may be coupled between switch SW and cellular transceiver circuitry 32. Filter circuitry 247 may include passive filtering circuitry such as duplexer circuitry, diplexer circuitry, low pass filter circuitry, high pass filter circuitry, bandpass filter circuitry, notch filter circuitry, impedance matching circuitry, etc. Filter circuitry 247 may serve to isolate transmit ports of cellular transceiver circuitry 32 from receive ports of cellular transceiver circuitry 32, for example. Receive ports of cellular transceiver circuitry 32 may be coupled to low noise amplifiers such as low noise amplifier 245. Transmit ports of cellular transceiver circuitry 32 may be coupled to power amplifiers such as power amplifier 244. This example is merely illustrative and, in general, cellular transceiver circuitry 32 may include any desired number of transmit and receive ports and any desired filtering circuitry arranged in any desired manner. Low noise amplifier 245 and/or power amplifier 244 may be formed as a part of cellular transceiver circuitry 32 if desired.

If desired, additional radio-frequency front end circuitry may be coupled to transmission lines 54F and 54B (not shown in FIG. 7 for the sake of clarity). This radio-frequency front end circuitry may include impedance matching circuitry, switching circuitry, filter circuitry, or any other desired radio-frequency front end components (e.g., networks of passive and/or active (adjustable) components such as resistors, inductors, and capacitors). As an example, additional filter circuitry may be coupled to transmission line 54F to isolate cellular transceiver circuitry 32 from radio-frequency signals in WLAN, WPAN, and satellite navigation communications bands.

Baseband processor circuitry 200 may control switch SW (e.g., through switch controller 216) to couple an optimal one of front antenna 40F and rear antenna 40B to cellular transceiver circuitry 32 at a given time. For example, in scenarios where rear antenna 40B is capable of satisfactory wireless performance in cellular telephone communications bands (e.g., in the cellular telephone midband), baseband processor circuitry 200 may control switch SW to couple cellular transceiver circuitry 32 to rear antenna 40B and rear antenna 40B may transmit and receive radio-frequency signals in the cellular telephone communications bands through rear housing wall 12R (FIG. 4).

However, if rear antenna 40B exhibits unsatisfactory wireless performance in the cellular telephone communications band (e.g., in the cellular telephone midband), baseband processor circuitry 200 may toggle switch SW to couple cellular transceiver circuitry 32 to front antenna 40F and front antenna 40F may transmit and receive radio-frequency signals in the cellular telephone communications band through display cover layer 82 (FIG. 4).

As shown in FIG. 7, a first radio-frequency coupler 218 may be coupled to transmission line 54F and a second radio-frequency coupler 220 may be coupled to transmission line 54B. Coupler 218 may be coupled to baseband processor circuitry 200 over feedback path 228. Coupler 220 may be coupled to baseband processor circuitry 200 over feedback path 230. This is merely illustrative and, in another suitable arrangement, feedback paths 228 and 230 may be provided to a feedback receiver interposed between the couplers and baseband processor circuitry 200.

Coupler 218 may be used to tap radio-frequency signals in cellular telephone communications bands flowing to and from front antenna 40F. Tapped radio-frequency signals from coupler 218 may be processed using baseband processor circuitry 200 and/or a feedback receiver to generate wireless performance metric data associated with the wireless performance of front antenna 40F in the cellular telephone communications bands. Coupler 220 may be used to tap radio-frequency signals in cellular telephone communications bands flowing to and from rear antenna 40B. Tapped antenna signals from coupler 220 may be processed using baseband processor circuitry 200 and/or a feedback receiver to generate wireless performance metric data associated with the wireless performance of rear antenna 40B in the cellular telephone communications bands. The tapped radio-frequency signals may include a tapped version of the signals being transmitted by power amplifier 244 (sometimes referred to as forward signals) and a tapped version of the transmitted signals that have been reflected from antennas 40F or 40B (sometimes referred to as reverse signals). If desired, control circuitry such as baseband processor circuitry 200 may control switching circuitry in couplers 218 and 220 to provide a selected one of the forward and reverse signals to baseband processor circuitry 200 at a given time.

The wireless performance metric data generated using the tapped signals may include phase and magnitude measurements of the impedance of antennas 40F and 40B. For example, by processing the forward and reverse signals for front antenna 40F, baseband processor circuitry 200 may gather information on the phase and magnitude of the impedance of front antenna 40F in real time. The phase and magnitude measurements may include complex impedance data such as scattering parameter (so-called "S-parameter") values that are indicative of the complex impedance of front antenna 40F. Measurements of the S-parameters may include, for example, measured reflection coefficient parameter values (so-called S11 values) that are indicative of the amount of radio-frequency signals that is reflected back towards coupler 218 from front antenna 40F during signal transmission. Similarly, baseband processor circuitry 200 may gather phase and magnitude measurements such as S-parameters for rear antenna 40B.

The phase and magnitude of the impedance of antennas 40F and 40B may be used to determine whether the operation of antennas 40F or 40B have been affected by the operating environment of device 10 (e.g., whether the presence of an external object has detuned or changed the loading of antennas 40F or 40B). For example, baseband processor circuitry 200 may detect variations in the gathered phase and magnitude information (e.g., excessively high magnitude S11 measurements, etc.) to identify when rear antenna 40B has been detuned/loaded by the presence of an external object. If baseband processor circuitry 200 detects that rear antenna 40B has been detuned due to the loading of rear antenna 40B (e.g., due to the user adjusting strap 15 of FIG. 4, changing strap 15, adjusting an orientation of device 10 relative to wrist 114, strap 15 becoming wet, a different user wearing device 10, etc.), baseband processor circuitry 200 may issue control signal CTRL over control path 210 to adjust switch SW to switch front antenna 40F into use for handling cellular telephone communications (e.g., in the cellular telephone midband) instead of the detuned rear antenna 40B. After front antenna 40F has been switched into use, wireless circuitry 34 may continue to perform cellular telephone communications (using front antenna 40F) even though rear antenna 40B has become detuned.

If desired, other performance metric data such as receive signal strength data may be used to determine which of antennas 40F and 40B to couple to cellular transceiver circuitry 32 at a given time. If desired, baseband processor circuitry 200, cellular transceiver circuitry 32, and/or separate receive signal strength measurement circuitry may receive signals from antennas 40F and 40B (e.g., via low noise amplifier circuitry 245). These components may gather information indicative of the receive signal strength of radio-frequency signals received in cellular telephone communications bands using antennas 40F and 40B. For example, these components may gather Received Signal Strength Indicator (RSSI) values from the receive signals. In one suitable arrangement, diode detector circuitry may be used to convert the received radio-frequency signals to a known voltage level for extracting the RSSI values. The RSSI values may be transmitted to baseband processor circuitry 200 or applications processor 202. The gathered RSSI values may be accumulated and stored for each antenna (e.g., in a data structure such as a database file).

Baseband processor circuitry 200 may process the gathered performance metric information (e.g., the gathered RSSI values) to determine whether the current antenna needs to be switched out of use for cellular telephone communications. For example, when the gathered RSSI values gathered by a given antenna drops below a predetermined threshold value, baseband processor circuitry 200 may control switch SW to switch the other antenna into use for performing cellular telephone communications. In general, any desired wireless performance metric values may be used in determining which antenna to use for cellular telephone communications (e.g., receiver sensitivity values, signal-to-noise ratio values, noise floor values, error rate values, RSSI values, etc.).

If desired, switch controller 216, switch SW, coupler 218, coupler 220, filter circuitry 247, power amplifier 244, and/or low noise amplifier 245 may be formed on a common substrate 240 such as a shared integrated circuit, integrated circuit package, chip, flexible printed circuit, rigid printed circuit board, etc. The example of FIG. 7 is merely illustrative and, in general, any desired circuitry may be used to control front antenna 40F to perform wireless communications in WLAN, WPAN, GPS, and cellular telephone communications bands while also controlling rear antenna 40B to perform wireless communications in cellular telephone communications bands with front antenna 40F using an antenna diversity scheme.

Figure 8:
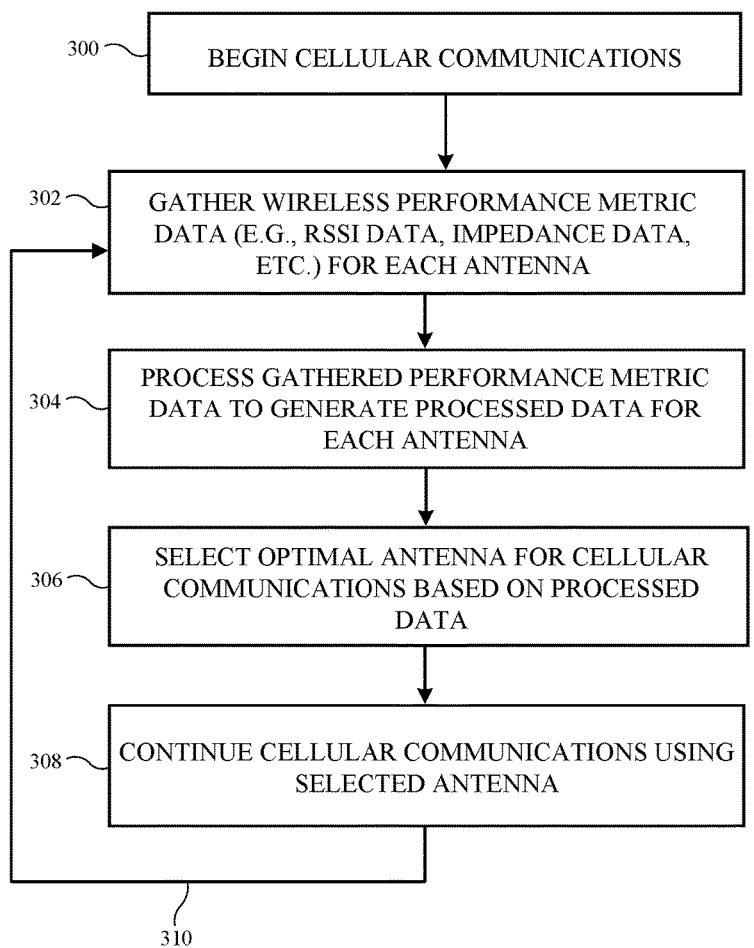
FIG. 8 is a flow chart of illustrative steps involved in selecting an optimal one of the antennas shown in FIGS. 4-7 for performing wireless communications in accordance with an embodiment.

FIG. 8 is a flow chart of illustrative steps that may be performed by wireless circuitry 34 and control circuitry 20 for operating front antenna 40F and rear antenna 40B in cellular telephone communications bands using an antenna diversity scheme. The steps of FIG. 8 may, for example, be performed while front antenna 40F concurrently transmits and/or receives radio-frequency signals in WLAN, WPAN, and/or satellite navigation communications bands using circuitry 36 and 38 of FIG. 7.

At step 300, wireless circuitry 34 may begin performing cellular telephone communications. Cellular transceiver circuitry 32 of FIG. 7 may transmit and/or receive radio-frequency signals in a cellular telephone communications band (e.g., the cellular midband) using antennas 40F and/or 40B. For example, baseband processor circuitry 200 may toggle switch SW to alternate between using antennas 40F and 40B to convey radio-frequency signals in the cellular telephone communications band or may convey radio-frequency signals in the cellular telephone communications band using only one of antennas 40F and 40B.

At step 302, wireless circuitry 34 may gather wireless performance metric data associated with wireless performance of antennas 40F and/or 40B in the cellular telephone communications band. For example, wireless circuitry 34 may gather wireless performance metric data using both antennas 40F and 40B. In this scenario, baseband processor circuitry 200 may control switch SW to toggle between antennas 40F and 40B and baseband processor circuitry 200 may gather radio-frequency performance metric data for each antenna while that antenna is coupled to cellular transceiver circuitry 32. In another suitable scenario, baseband processor circuitry 200 may gather radio-frequency performance metric data using only one of antennas 40F and 40B. The wireless performance metric data may include RSSI values, impedance data such as phase and magnitude values (e.g., gathered using couplers 218 and 220), and/or any other desired radio-frequency performance metric data.

At step 304, baseband processor circuitry 200 and/or applications processor 202 may process the gathered wireless performance metric data to generate processed data.

Baseband processor circuitry 200 may generate the processed data by, for example, generating averages of multiple individual wireless performance metric data values gathered by antennas 40F and/or 40B over time, generating linear combinations of multiple individual wireless performance metric data values gathered by antennas 40F and/or 40B over time, and/or by filtering the gathered wireless performance metric data.

Filtering the wireless performance metric data may, for example, allow baseband circuitry 200 to distinguish an actual deterioration in wireless antenna performance from noise or false positives. As an example, baseband processor circuitry 200 may compare the gathered wireless performance metric data to user statistics associated with the orientation/position of device 10, the geographic location of device 10, predetermined patterns of wireless performance metric data associated with known events, etc.

At step 306, baseband processor circuitry 200 may select an optimal one of antennas 40F and 40B to use for cellular telephone communications based on the processed data generated at step 304. For example, baseband processor circuitry 200 may determine which of antennas 40F and 40B exhibits superior wireless performance (e.g., greater RSSI values) in the cellular telephone communications band and may select that antenna to use for subsequent cellular telephone communications. In scenarios where wireless performance metric data was only gathered for a single antenna such as rear antenna 40B during step 302, baseband processor circuitry 200 may compare the processed data to a range of acceptable values (e.g., a range of acceptable wireless performance metric values such as a range of acceptable RSSI values defined by a minimum acceptable RSSI threshold value) to determine whether front antenna 40F should be switched into use. In this scenario, if the processed data gathered for rear antenna 40B falls outside of the range of acceptable values (e.g., if the processed data is less than the minimum acceptable RSSI threshold value), baseband processor circuitry 200 may select front antenna 40F for use in performing subsequent cellular telephone communications.

At step 308, baseband processor circuitry 200 may control switch SW to couple the selected antenna (e.g., as determined while processing step 306) to cellular transceiver circuitry 32 use for subsequent cellular telephone communications. The selected antenna may continue to convey radio-frequency signals in the cellular telephone communications band (e.g., the cellular telephone midband). Processing may loop back to step 302 as shown by path 310 to continue to monitor the wireless performance of antennas 40F and/or 40B. In this way, an optimal one of antennas 40F and 40B may be switched into use for performing cellular telephone communications at a given time regardless of any changing environmental conditions around device 10. If desired, tunable components 50 of FIG. 3 may also be adjusted to adjust the frequency response, polarization, or radiation pattern shape for the selected antennas to further optimize wireless performance.

The example of FIG. 8 is merely illustrative. If desired, baseband processor circuitry 200 may continuously or periodically gather wireless performance metric data or may gather wireless performance metric data in response to a software trigger for one or both of antennas 40F and 40B in the cellular telephone communications band. Wireless performance metric data may be gathered in response to transmitted or received communications data or in response to transmitted or received test signals (e.g., signals that do not include communications data).

Figure 9:
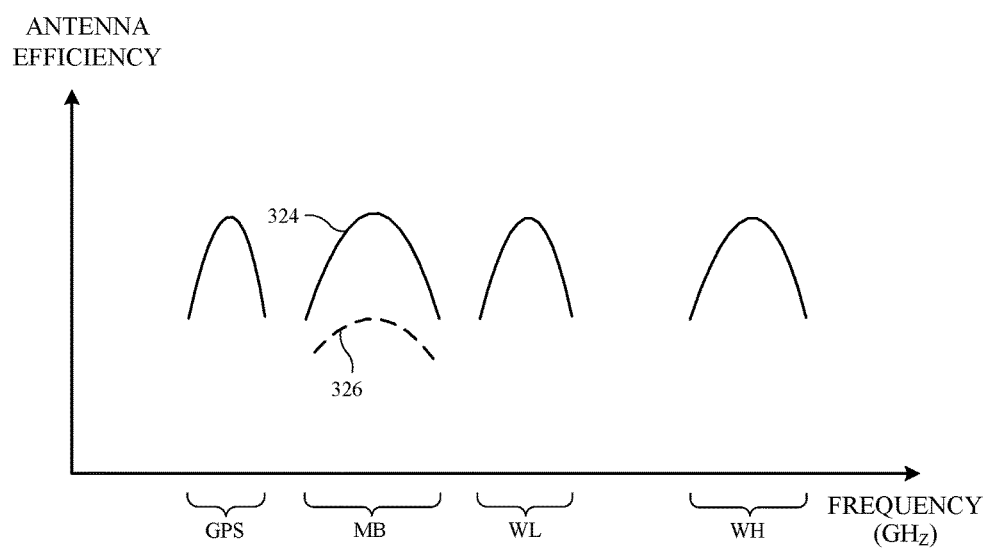
FIG. 9 is a graph of antenna performance (antenna efficiency) for illustrative antennas of the types shown in FIGS. 4-7 in accordance with an embodiment.

FIG. 9 is a graph in which the collective antenna performance (antenna efficiency) of antennas 40F and 40B of FIGS. 4-7 has been plotted as a function of operating frequency. As shown in FIG. 9, front antenna 40F may contribute coverage for wireless circuitry 34 in multiple communications bands such as the GPS band centered at 1575 MHz, a 2.4 GHz WLAN band WL (e.g., extending between about 2400 MHz and 2500 MHz), a 5.0 GHz WLAN band WH (e.g., extending between about 5150 MHz and 5850 MHz), and cellular midband MB (e.g., a band extending between approximately 1700 MHz and 2200 MHz). Rear antenna 40B may also contribute coverage in cellular telephone midband MB.

When the wireless performance of the antenna coupled to cellular transceiver circuitry 32 is deteriorated (e.g., due to loading by environmental factors), wireless circuitry 34 may exhibit a reduced efficiency in cellular telephone midband MB as shown by curve 326. Baseband processor circuitry 200 may identify this deterioration (e.g., using wireless performance metric data gathered at step 304 and processed at step 306 of FIG. 8) and may subsequently toggle switch SW to switch the other antenna into use for performing wireless communications in cellular midband MB. After switching the other antenna into use, wireless circuitry 34 may exhibit a satisfactory efficiency in cellular midband MB as shown by curve 324. By switching an optimal one of antennas 40F and 40B into use at a given time, wireless circuitry 34 may continue to exhibit satisfactory efficiency in cellular telephone midband MB regardless of external environmental factors, while also covering the GPS band and WLAN bands WL and WH.

The example of FIG. 9 is merely illustrative. While the response of front antenna 40F in bands GPS, MB, WL, and WH are shown as individual peaks, the bandwidth of front antenna 40F may in practice be sufficiently wide to extend from at least the lower limit of band GPS to at least the upper limit of band WH, for example. If desired, front antenna 40F may also cover the cellular telephone low band extending down to approximately 600 MHz and/or the cellular telephone high band extending between bands WL and WH. In general, antennas 40F and 40B may cover one or more of any desired communications bands and may perform antenna diversity operations in one or more of any desired communications bands. The antenna structures used to form antennas 40F and 40B of FIGS. 4-7 are merely illustrative and, in general, any desired antenna structures may be used.

The foregoing is merely illustrative and various modifications can be made to the described embodiments. The foregoing embodiments may be implemented individually or in any combination.

What is claimed is:

1. An electronic device having opposing front and rear faces, comprising:
   a display on the front face, wherein the display forms part of a first antenna resonating element for a first antenna;
   a housing having a rear housing wall on the rear face;
   conductive structures that form part of a second antenna resonating element for a second antenna;
   radio-frequency transceiver circuitry mounted in the housing; and
   switching circuitry having a first terminal coupled to the first antenna, a second terminal coupled to the second antenna, and a third terminal coupled to the radio-frequency transceiver circuitry, wherein the switching circuitry has a first state in which the first terminal is coupled to the third terminal and a second state in which the second terminal is coupled to the third terminal, the first antenna is configured to transmit and receive the radio-frequency signals while the switching circuitry is in the first state, and the second antenna is configured to transmit and receive the radio-frequency signals through the rear housing wall while the switching circuitry is in the second state.

2. The electronic device defined in claim 1, wherein the display comprises conductive display structures and a display cover layer that overlaps the conductive display structures, the housing comprises conductive housing walls that extend from the rear housing wall to the display cover layer, and the first antenna includes a first antenna feed having a first antenna feed terminal coupled to the conductive display structures and a second antenna feed terminal coupled to the conductive housing walls.

3. The electronic device defined in claim 2, wherein the first antenna comprises a radiating slot having edges defined by the conductive housing walls and the conductive display structures.

4. The electronic device defined in claim 3, wherein the second antenna comprises a second antenna feed having a third antenna feed terminal coupled to the conductive structures and a fourth antenna feed terminal coupled to the conductive housing walls.

5. The electronic device defined in claim 4, wherein the conductive structures comprise conductive structures selected from the group consisting of: conductive traces patterned directly onto the rear housing wall and conductive traces on a substrate that overlaps the rear housing wall.

6. The electronic device defined in claim 5, further comprising:
   a wireless power receiving coil that is aligned with an opening in the conductive structures and that is configured to receive wireless power through the rear housing wall.

7. The electronic device defined in claim 1, wherein the housing comprises conductive housing walls that extend from the rear housing wall to the display, the second antenna comprises an antenna feed having a first antenna feed terminal coupled to the conductive structures and a second antenna feed terminal coupled to the conductive housing walls, and the conductive structures comprise conductive structures selected from the group consisting of: conductive traces patterned directly onto the rear housing wall and conductive traces on a substrate that overlaps the rear housing wall.

8. The electronic device defined in claim 1, wherein the radio-frequency transceiver circuitry comprises cellular telephone transceiver circuitry and the radio-frequency signals comprise radio-frequency signals in a cellular telephone communications band.

9. The electronic device defined in claim 8, further comprising:
   control circuitry coupled to the cellular telephone transceiver circuitry, wherein the control circuitry is configured to identify wireless performance metric data associated with wireless performance of the first and second antennas in the cellular telephone communications band.

10. The electronic device defined in claim 9, wherein the control circuitry comprises baseband processor circuitry coupled to the cellular telephone transceiver circuitry, and the baseband processor circuitry is configured to control the switching circuitry to place the switching circuitry into a selected one of the first and second states based on the wireless performance metric data.

11. The electronic device defined in claim 10, further comprising:
wireless local area network transceiver circuitry coupled to the first antenna; and
satellite navigation receiver circuitry coupled to the first antenna, wherein the first antenna is configured to convey additional radio-frequency signals for the wireless local area network transceiver circuitry and the satellite navigation receiver circuitry while the switching circuitry is in the first state and while the switching circuitry is in the second state.

12. The electronic device defined in claim 11, wherein the cellular telephone communications band comprises a cellular telephone communications band at frequencies between 1700 MHz and 2200 MHz.

13. A wristwatch, comprising:
a housing having opposing first and second sides;
a first antenna at the first side of the housing;
a second antenna at the second side of the housing;
a first radio-frequency transceiver configured to transmit first radio-frequency signals in a first communications band using the first antenna;
switching circuitry coupled to the first and second antennas;
a second radio-frequency transceiver coupled to the switching circuitry and configured to transmit second radio-frequency signals in a second communications band; and
control circuitry configured to control the switching circuitry to route the second radio-frequency signals to a selected one of the first and second antennas.

14. The wristwatch defined in claim 13, wherein the control circuitry is configured to identify wireless performance metric data associated with wireless performance of the second antenna in the second communications band and is configured to control the switching circuitry based on the wireless performance metric data.

15. The wristwatch defined in claim 14, wherein the wireless performance metric data comprises receive signal strength Received Signal Strength Indicator (RSSI) data gathered based at least on signals received by the second antenna.

16. The wristwatch defined in claim 14, further comprising:
a radio-frequency coupler interposed between the switching circuitry and the second antenna, wherein the wireless performance metric data comprises impedance information associated with the second antenna gathered by the control circuitry using the radio-frequency coupler.

17. The wristwatch defined in claim 13, further comprising:
a satellite navigation receiver configured to receive third radio-frequency signals in a satellite navigation communications band using the first antenna.

18. The wristwatch defined in claim 17, wherein the first radio-frequency transceiver comprises a wireless local area network transceiver, the first communications band comprises a wireless local area network communications band, the second radio-frequency transceiver comprises a cellular telephone transceiver, and the second communications band comprises a cellular telephone communications band.

19. The wristwatch defined in claim 18, further comprising:
a display at the first side of the housing, wherein the housing comprises a rear housing wall and conductive housing sidewalls extending from the rear housing wall to the display; and
conductive structures that form at least part of an antenna resonating element for the second antenna and that transmit the second radio-frequency signals through the rear housing wall, wherein the first antenna comprises a first antenna feed terminal coupled to conductive display structures in the display, a second antenna feed terminal coupled to the conductive housing sidewalls, and a radiating slot defined by the conductive display structures and the conductive housing sidewalls, the second antenna further comprising a third antenna feed terminal coupled to the conductive structures and a fourth antenna feed terminal coupled to the conductive housing sidewalls.

20. A wristwatch having opposing first and second faces, comprising:
a housing having a rear housing wall on the second face and having a conductive housing sidewall;
a display mounted to the housing on the first face;
a first antenna having a first antenna resonating element formed from conductive structures in the display and the conductive housing sidewall;
a second antenna having a second antenna resonating element configured to radiate through the rear housing wall;
wireless local area network transceiver circuitry configured to transmit and receive first wireless signals in a wireless local area network communications band using the first antenna;
satellite navigation receiver circuitry configured to receive second wireless signals in satellite navigation communications band using the first antenna;
cellular telephone transceiver circuitry configured to transmit and receive third wireless signals in a cellular telephone communications band;
switching circuitry coupled to the first and second antennas and configured to route the third wireless signals between the cellular telephone transceiver circuitry and a selected one of the first and second antennas; and
filter circuitry coupled to the first antenna and configured to isolate the wireless local area network transceiver circuitry and the satellite navigation receiver circuitry from the third wireless signals.

21. The electronic device defined in claim 1, wherein the display comprises conductive display structures and a display cover layer that overlaps the conductive display structures, the first antenna having an antenna feed terminal coupled to the conductive display structures.

* * * * *